US011436267B2

(12) United States Patent
Tagra et al.

(10) Patent No.: US 11,436,267 B2
(45) Date of Patent: Sep. 6, 2022

(54) CONTEXTUALLY SENSITIVE DOCUMENT SUMMARIZATION BASED ON LONG SHORT-TERM MEMORY NETWORKS

(71) Applicant: International Business Machines Corporation, Armonk, NY (US)

(72) Inventors: Ankur Tagra, Bangalore (IN); Vijay Kalangumvathakkal, Pathanamthitta (IN); Sudheesh S. Kairali, Kozhikode (IN)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 16/736,923

(22) Filed: Jan. 8, 2020

(65) Prior Publication Data

US 2021/0209142 A1    Jul. 8, 2021

(51) Int. Cl.
*G06F 17/00* (2019.01)
*G06F 16/34* (2019.01)
*G06F 40/30* (2020.01)
*G06N 3/08* (2006.01)
*G06F 17/16* (2006.01)
*G06N 3/04* (2006.01)
*G06F 40/166* (2020.01)

(52) U.S. Cl.
CPC ............ *G06F 16/345* (2019.01); *G06F 17/16* (2013.01); *G06F 40/166* (2020.01); *G06F 40/30* (2020.01); *G06N 3/04* (2013.01); *G06N 3/08* (2013.01)

(58) Field of Classification Search
CPC ...... G06F 40/166; G06F 16/345; G06F 40/30; G06F 17/16; G06N 3/04; G06N 3/08
See application file for complete search history.

(56) References Cited

U.S. PATENT DOCUMENTS

| 7,712,028 B2 | 5/2010 | Kuruoglu | |
| 10,402,723 B1* | 9/2019 | Silberman | G06N 3/006 |
| 2007/0074102 A1 | 3/2007 | Kraft | |
| 2013/0031016 A1* | 1/2013 | Rubinstein | G06Q 10/0635 |
| | | | 705/321 |
| 2014/0040723 A1* | 2/2014 | Bao | G06Q 30/0277 |
| | | | 715/234 |
| 2014/0195897 A1 | 7/2014 | Balinsky | |

(Continued)

OTHER PUBLICATIONS

Tagra, Ankur et al., "Vector Representation Based on Context", U.S. Appl. No. 16/147,812, filed Sep. 30, 2018, 37 pages.

*Primary Examiner* — Mohammed H Zuberi
(74) *Attorney, Agent, or Firm* — Randy E. Tejeda (57) ABSTRACT

In an approach to summarizing contextually sensitive text documents based on long short-term memory networks, one or more computer processors create a model based on a vectorized document corpus. The one or more computer processors determine one or more contextually relevant sections utilizing the created model. The one or more computer processors generate a relevancy level for each of the one or more respective determined sections. The one or more computer processors prioritize each of the one or more determined sections based on the respective relevancy level. The one or more computer processors generate one or more textual summaries based on the prioritized sections, wherein the generated one or more textual summaries are aggregated into a document.

15 Claims, 3 Drawing Sheets

(56) References Cited

U.S. PATENT DOCUMENTS

| | | | |
|---|---|---|---|
| 2017/0161242 A1 | 6/2017 | Clark | |
| 2017/0213130 A1 | 7/2017 | Khatri | |
| 2018/0300400 A1* | 10/2018 | Paulus | G06N 3/0454 |
| 2018/0365323 A1* | 12/2018 | Doornenbal | G06F 16/9535 |
| 2019/0129947 A1* | 5/2019 | Shin | G10L 25/30 |
| 2019/0251340 A1* | 8/2019 | Brown | G06N 3/0445 |
| 2019/0317986 A1* | 10/2019 | Kobayashi | G06F 17/18 |
| 2021/0075704 A1* | 3/2021 | Chan | H04L 43/065 |
| 2021/0174168 A1* | 6/2021 | Dalli | G06N 5/045 |

* cited by examiner

CONTEXTUALLY SENSITIVE DOCUMENT SUMMARIZATION BASED ON LONG SHORT-TERM MEMORY NETWORKS

BACKGROUND

The present invention relates generally to the field of machine learning, and more particularly to text summarization.

Artificial neural networks (ANN) are computing systems inspired by biological neural networks. The ANN itself is not an algorithm, but rather a framework for many different machine learning algorithms to work together and process complex data inputs. Such systems "learn" to perform tasks by considering examples, generally without being programmed with any task-specific rules. For example, in image recognition, ANNs learn to identify images that contain cats by analyzing example images that are correctly labeled as "cat" or "not cat" and using the results to identify cats in other images. ANNs accomplish this without any prior knowledge about cats, for example, that cats have fur, tails, whiskers, and pointy ears. Instead, ANNs automatically generate identifying characteristics from the learning material. ANNs are based on a collection of connected units or nodes called artificial neurons, which loosely model the neurons in a biological brain. Each connection, like the synapses in a biological brain, can transmit a signal from one artificial neuron to another. An artificial neuron that receives a signal can process the signal and then transfer the signal to additional artificial neurons.

In common ANN implementations, the signal at a connection between artificial neurons is a real number, and the output of each artificial neuron is computed by some non-linear function of the sum of its inputs. The connections between artificial neurons are called 'edges'. Artificial neurons and edges typically have a weight that adjusts as learning proceeds. The weight increases or decreases the strength of the signal at a connection. Artificial neurons may have a threshold such that the signal is only sent if the aggregate signal crosses that threshold. Typically, artificial neurons are aggregated into layers. Different layers may perform different kinds of transformations on their inputs. Signals travel from the first layer (the input layer), to the last layer (the output layer), possibly after traversing the layers multiple times.

A recurrent neural network (RNN) is a class of artificial neural network where connections between nodes form a directed graph along a sequence allowing the network to exhibit temporal dynamic behavior for a time sequence. Unlike feedforward neural networks, RNNs can use internal states (memory) to process sequences of inputs allowing the RNN to be applicable to tasks such as unsegmented connected handwriting recognition or speech recognition. Long short-term memory (LSTM) units are alternative layer units of a recurrent neural network (RNN). An RNN composed of LSTM units is referred as a LSTM network. A common LSTM unit is composed of a cell, input gate, output gate, and forget gate. The cell remembers values over arbitrary time intervals and the gates regulate the flow of information into and out of the cell. Gated recurrent units (GRUs) are a gating mechanism in recurrent neural networks. GRU performance on polyphonic music modeling and speech signal modeling was found to be similar to LSTM. However, GRUs exhibit better performance on smaller datasets. LSTMs can be bidirectional (BLSTM) consisting of two LSTM networks where each contained layer is unrolled forward and backward in time.

SUMMARY

Embodiments of the present invention disclose a computer-implemented method, a computer program product, and a system for summarizing contextually sensitive text documents based on long short-term memory networks. The computer-implemented method includes one or more computer processers creating a model based on a vectorized document corpus. The one or more computer processors determine one or more contextually relevant sections utilizing the created model. The one or more computer processors generate a relevancy level for each of the one or more respective determined sections. The one or more computer processors prioritize each of the one or more determined sections based on the respective relevancy level. The one or more computer processors generate one or more textual summaries based on the prioritized sections, wherein the generated one or more textual summaries are aggregated into a document.

DETAILED DESCRIPTION

Traditionally, text documents contain information related to various contexts, topics, and objects. There does not exist a single word or vector word representation that can summarize an entire text document due to various contexts requiring diverging representations specific to a scenario or document. For example, text summarization for gaming documents would have drastically different summarizations compared to news documents. Embodiments of the present invention allow for the identification of contextually sensitive sections in a document. Embodiments of the present invention allow for the identification of sections of a document that have low contextual words and significance, allowing the removal of said sections during summarization. Embodiments of the present invention recognize that only summarizing contextually relevant sections in a document reduces the computational requirements of the associated model and resulting output. Implementation of embodiments of the invention may take a variety of forms, and exemplary implementation details are discussed subsequently with reference to the Figures.

The present invention will now be described in detail with reference to the Figures.

Figure 1:
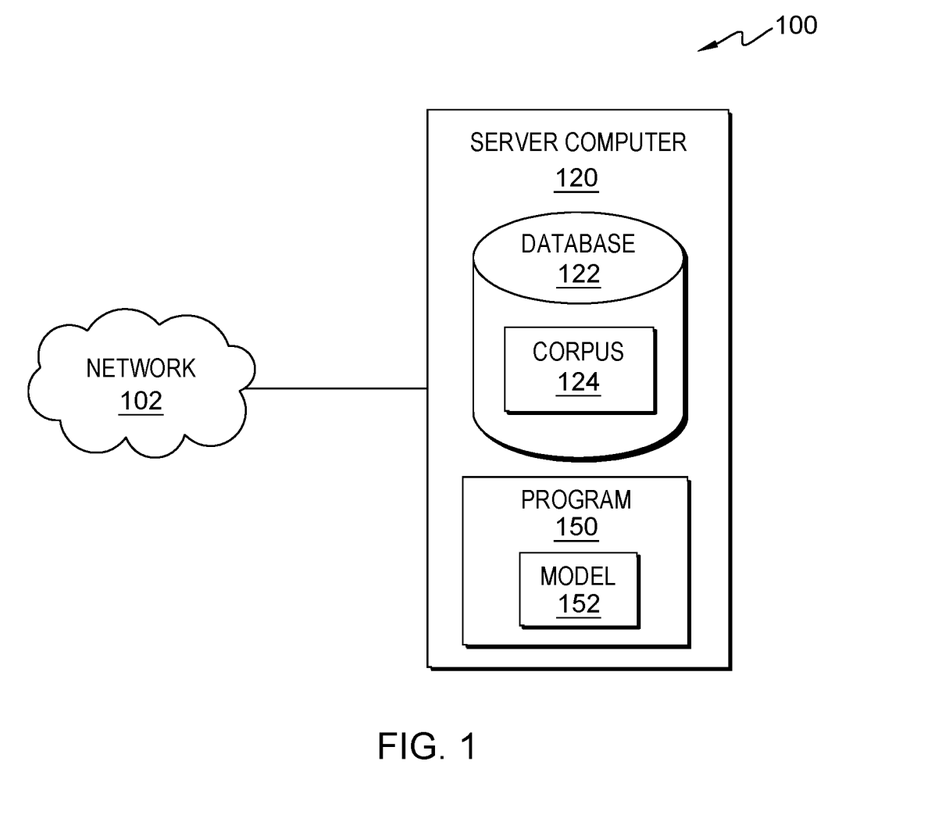
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120, and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 3.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In the depicted embodiment, database 122 includes corpus 124.

Corpus 124 may contain one or more sets of one or more instances of classified (e.g., labelled) data, hereinafter referred to as training statements, organized in one or more sets, partitions, arrays, or data structures, hereinafter referred to as training sets. In an embodiment, each training set includes a label and an associated array or set of training statements. In an example, corpus 124 includes sections of text (e.g., training statements) and associated summaries (e.g., labels, classifications, etc.). Multiple training statements comprise a training set. In a further embodiment, training corpus 124 contains vectorized (i.e., one-hot encoding, word embedded, dimension reduced, etc.) training sets and associated training statements. In an embodiment, corpus 124 contains a plurality of training statements containing sections and paragraphs with associated summaries. In a further embodiment, corpus 124 contains decomposed sections and paragraphs, wherein each section and paragraph are partitioned into sentences, phrases, and individual words. In this embodiment, each decomposed partition is associated with a label (e.g., summary, related section, related topic, etc.).

Model 152 utilizes deep learning techniques to identify contextually sensitive text. In an embodiment, program 150 utilizes model 152 identify one or more contextually sensitive words, phrases, sentences, paragraphs, section, or documents. Specifically, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised and/or unsupervised methods. In the depicted embodiment, model 152 utilizes a recurrent neural network (RNN) trained utilizing supervised training methods. In an embodiment, model 152 utilizes gated recurrent units (GRU). GRUB simplify the training process while reducing the amount of necessary computational resources. In another embodiment, model 152 utilizes LSTM. LSTM entails a more robust process, requiring more computational resources but LSTM is more effective when training from large datasets. In various embodiments, the hidden layers of model 152 may be unidirectional or bidirectional.

In an embodiment, model 152 assesses text (e.g., words, sentences, phrases, paragraphs, sections, etc.) by considering different features, available as structured or unstructured data, and applying relative numerical weights. Program 150 feeds a vectorized training set of feature data to model 152. In various embodiments, the input (e.g., training statement) is labeled with an associated context, summary, or abstraction (e.g., topic) enabling model 152 to learn what features are correlated to a specific context or summarization, prior to use. Model 152 is trained to recognize the contextually similar portions of text and learn which portions are significant to the overall document. Once trained, model 152 can generate textual summaries based on the data aggregated and fed by program 150. The training of model 152 is depicted and described in further detail with respect to FIG. 2.

Program 150 is a program for summarizing contextually sensitive text documents based on long short-term memory networks. In various embodiments, program 150 may implement the following steps: create a model based on a vectorized document corpus; determine one or more contextually relevant sections utilizing the created model; generate a relevancy level for each of the one or more respective determined sections; prioritize each of the one or more determined sections based on the respective relevancy level; generate one or more textual summaries based on the prioritized sections, wherein the generated one or more textual summaries are aggregated into a document In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on any computing device (not depicted) within computational environment 100. In an embodiment, program 150 contains model 152. Program 150 is depicted and described in further detail with respect to FIG. 2.

The present invention may contain various accessible data sources, such as database 122, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
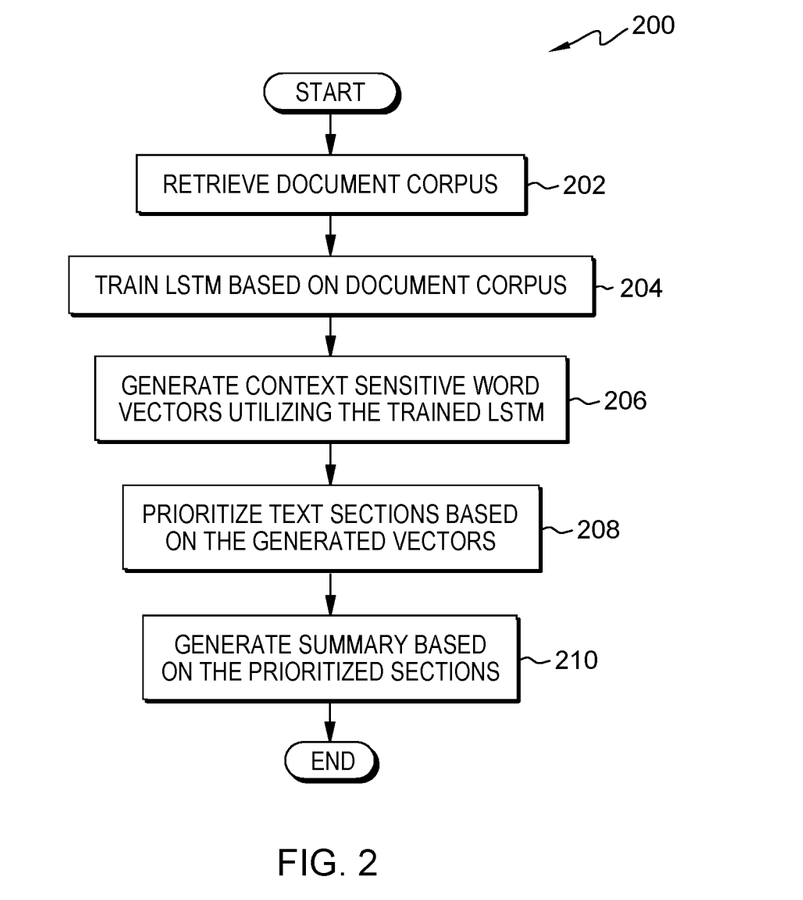
FIG. 2 is a flowchart depicting operational steps of a program, on a server computer within the computational environment of FIG. 1, for summarizing contextually sensitive text documents based on long short-term memory networks, in accordance with an embodiment of the present invention.

FIG. 2 is a flowchart depicting operational steps of program 150 for summarizing contextually sensitive text documents based on long short-term memory networks, in accordance with an embodiment of the present invention.

Program 150 retrieves document corpus (step 202). In an embodiment, program 150 initiates when a document or corpus is detected. In another embodiment, program 150 initiates based on a user interaction. For example, a user transmits an initiation notification to program 150 to initiate the creation and training of one or more LSTM models. In an embodiment, program 150 retrieves one or more documents or training sets from corpus 124. In yet another embodiment, a user inputs one or more documents or training sets into program 150. In an embodiment, program 150 utilizes NLP techniques to parse and analyze retrieved documents and associated labels. In an embodiment, program 150 utilizes section filtering to identify distinct categories, sections, themes, or topics within a document. In a further embodiment, program 150 subdivides each section into contexts and topics (e.g., related text). In another embodiment, program 150 utilizes sentence boundary disambiguation (sentence splitting) to delineate the boundaries of a sentence within a section or document. As each sentence/section is processed, program 150 may, in parallel, process the context and utilize said context as labels for the sentence/section set.

In an embodiment, responsive to the initial processing detailed above, program 150 tokenizes the identified and parsed sections. In this embodiment, program 150 splits every identified section into individual terms and inserts the terms in an array or set, such as a sentence representation. In an alternative embodiment, a tokenized section array is constructed into a set, structure, and/or object containing all identified sections and component terms from a given scope, context, and/or topic. In a further embodiment, program 150 removes punctuation (e.g., commas, periods, etc.) and reduces all letters to lowercase thus reducing required dimensions. In an additional embodiment, program 150 creates a plurality of sets of identified terms and associates these terms with other terms that appear sequentially in the same sentence and/or section.

In various embodiments, program 150 utilizes syntactic analysis to identify parts of speech and syntactic relations between various portions of the tokenized section or the tokenized sentence. In a further embodiment, program 150 utilizes part-of-speech tagging to identify the part of speech of one or more words in a section based on its relationship with adjacent and related words. In an embodiment, program 150 utilizes term frequency-inverse document frequency (tf-idf) techniques to calculate how important a term or word is to the sentence or to the document. In an embodiment, program 150 utilizes tf-idf to calculate a series of numerical weights for the terms extracted from a document. In a further embodiment, program 150 utilizes said calculations to identify and weigh frequently used terms. For example, program 150 increases a weight of a word proportional to a frequency the word appears in the documents and associated rules offset by a frequency of other documents and rules, in corpus 124, that contain the term. In an embodiment, program 150 assigns low tf-idf valued terms a low weight and high tf-idf valued terms are assigned a higher weight signifying greater importance to the set (e.g., section, sentence, document, corpus, etc.).

In an embodiment, program 150 partitions the tokenized and processed sentences/sections into multiple training and testing sets paired with associated labels. In another embodiment, program 150 partitions documents into discrete sets containing multiple versions of the same section or document but processed utilizing different NLP techniques. In yet another embodiment, program 150 constructs subsets by identifying the scope of the associated context and segmenting the documents or document sections into discrete context, topic, subject, or category sets. In various embodiments, program 150 non-deterministically divides the processed sets into training sets and test sets. In a further embodiment, program 150 attaches a corresponding rule to each sentence/section set as a label.

In an embodiment, program 150 vectorizes the processed and partitioned document (e.g., section and sentence sets) and label sets. In this embodiment, program 150 utilizes one-hot encoding techniques to vectorize categorical or string-based (word/term based) feature sets. For example, when vectorizing feature sets of individual words, program 150 creates a one-hot encoded vector comprising a 1×N matrix, where N symbolizes the number of distinguishable terms. In this embodiment, program 150 utilizes one-hot encoding to recode categorical data into a vectorized form. For example, when vectorizing an example term feature set consisting of [positive, numerical, string], program 150 encodes said corresponding feature set into the array containing [[1,0,0], [0,1,0], [0,0,1]]. In one embodiment, program 150 utilizes featuring scaling techniques (e.g., rescaling, mean normalization, etc.) to vectorize and normalize numerical feature sets. In various embodiments, program 150 utilizes word embedding techniques such as word2vec or doc2vec to produce vectors which denote similarities between words that share common contexts. Word embedding techniques create word-based vectors, similar to one-hot encoding, although word embedding creates vectors that are structured so that similar words are positioned in close proximity (e.g., within a 1% differential) to each other in the vector space. Another distinction between one-hot encoding and word embedding is that word embedding allows for a vector space dimension to include multiple words while one-hot encoding creates vector spaces with one dimension per word. For example, the sentence "the quick brown fox jumps over the lazy dog" and specifically the word fox could be word embedded as the vector [0,0,1,1,1,0,0,0], encompassing the word "fox" along with "brown" and "jumps". Word embedding vectors reduce the number of dimensions thus increasing the training speed of the model and reducing system memory requirements. In another embodiment, program 150 utilizes dimension reducing techniques, such as feature extraction, low-dimensional embedding, and kernelling, to reduce the number of dimensions required to represent the training data and features. Reducing the numbers of required dimensions (e.g., features, variables, etc.) reduces the required computational time and storage space, improves the interpretation of the parameters of the cognitive model, allows data visualization in low dimensions such as 2D or 3D, and avoids peaking phenomena.

Program 150 trains LSTM based on retrieved corpus (step 204). In an embodiment, program 150 initializes model 152 with randomly generated weights. In an alternative embodiment, program 150 initializes model 152 with weights calculated from the analysis described above in step 202 (e.g., tf-idf, etc.). In this embodiment, certain terms or words are weighed higher than others allowing the model to learn at a quicker rate with fewer computational resources. Program 150 can train model 152 by feeding the processed feature vectors into model 152. In an embodiment, program 150 trains model 152 with a plurality of feature vectors originating from the sets extracted from the documents and associated summarizations located in corpus 124. In various embodiments, program 150 determines which variation of a recurrent neural network to utilize. In a further embodiment, program 150 utilizes LSTM and/or GRU. In this embodiment, program 150 determines which variation of neural network to use based on a size of a corpus and associated training data. For example, for larger sets of training sets LSTM is utilized and for smaller sets GRU is utilized. In another embodiment, program 150 may utilize unidirectional or bidirectional hidden layers. Bidirectional hidden layers connect hidden layers of opposite directions to the same output allowing for the output layer to receive information from past and future states simultaneously. Bidirectional hidden layers allow for the context of an input (e.g., term, word, etc.) to be considered along with the input. Unidirectional hidden layers only pass information to future states therefore unidirectional hidden layers allow for less contextual information available to the output layer.

In an embodiment, program 150 utilizes processed training sets to perform supervised training of model 152. As would be recognized by one skilled in the art, supervised training determines the difference between a prediction and a target (i.e., the error), and back-propagates the difference through the layers such that model 152 "learns". In an embodiment, program 150 determines whether a sufficient accuracy is obtained by utilizing test sets and the associated test labels. In another embodiment, program 150 utilizes cross-entropy (e.g., Kullback-Leibler (KL) divergence, etc.) as a loss function to determine the level of accuracy of the model. In this embodiment, program 150 compares a predicted sequence (e.g., the generated summary) with an expected sequence (e.g. the historical summary). In yet another embodiment, program 150 may utilize the cross-entropy loss value to calculate a word error rate which further denotes a level of accuracy per word in a generated summary. In this embodiment, program 150 determines sufficient accuracy based on the word error rate generated by model 152. If the calculated accuracy is insufficient, then program 150 continues with supervised training of model 152. If the calculated accuracy is determined sufficient, then program 150 ends the training process.

Program 150 determines contextual paragraphs and sections utilizing trained LSTM (step 206). Responsive to receiving, inputting, and/or detecting a section of text or document, program 150 determines contextual paragraphs and sections utilizing the trained LSTM, described in step 204. Program 150 processes, vectorizes, and encodes one or more section of text utilizing the procedures and techniques described in step 202. Once processed, program 150 inputs the processed vectors into a trained LSTM, trained to recognize contextually sensitive sentences, paragraphs, and sections. In an embodiment, program 150 utilizes the vectors to identify contextually relevant and irrelevant sentences, phrases, paragraphs, and sections. In an embodiment, program 150 utilizes relevancy as a measure of importance or significance of one or more sections of text when compared to a sentence, paragraph or document, where removing a relevant section of text would substantially alter one or more other sections of text. In this embodiment, program 150 may determine whether a section is relevant or irrelevant by utilizing a relevancy threshold. For example, program 150 determines that a section is irrelevant if the section does not exceed a relevancy threshold of 80%. In a further embodiment, program 150 assigns a numerical value or weight (e.g., higher signifying greater contextual significance, etc.) to each generated vector based on relevancy to the document as a whole. In an embodiment, program 150 utilizes the trained LSTM to assign a relevancy weight/value to each sentence, paragraph, and section. In this embodiment, multiple weights/values may be assigned to each sentence, paragraph, and section based on a comparison object. For example, a sentence may have a different weight/value when compared to a parent paragraph, section, or document. The aforementioned vectors possess similar semantic abilities and contextually closer words have lesser Euclidean distances. In an embodiment, program 150 determines that a plurality of vectors are similar if the weights associated with the vectors are within 10% differential, or that exceed a weight threshold.

Program 150 prioritizes determined paragraphs and sections (step 208). In an embodiment, program 150 utilizes the determined contextual paragraphs and sections and prioritizes said information based on relevancy level, as indicated by the assigned numerical values. In this embodiment, program 150 utilizes attached relevancy weights/values (e.g., score, levels, etc.) to rank the determined paragraphs and sections, where more relevant or important text is ranked higher than irrelevant text. In an embodiment, program 150 removes terms, sentences, paragraphs, and sections that do not meet nor exceed a relevancy threshold. In another embodiment, program 150 recreates one or more documents with only relevant terms, sentences, paragraphs, sections, and documents.

Program 150 generates text summaries based on prioritizations (step 210). Program 150 utilizes the trained model and the learned weights and layers to calculate and generate the next term in a sequence (e.g., sentence, paragraph, context, summary, etc.) given prioritized text sequence (e.g., textual section (e.g., sentence, paragraph, section, etc.)). In one embodiment, utilizing the output of model 152, program 150 generates a series of terms and associated probabilities. Said probabilities denote the chance that the predicted term is the next term in the sequence. In an embodiment, program 150 utilizes a softmax layer in order to normalize the input vector (e.g., one-hot encoded and vectorized document, sequence of word embedded terms, etc.) of K real numbers into a probability distribution consisting of K probabilities. In this embodiment, the softmax layer converts the output vector (e.g., predicted sequence) into a probability contained in the interval (0,1), for example 0.58 or 58%.

Program 150 utilizes the weights (e.g., priorities) of the text to generate representative summaries. In an embodiment, program 150 selects the most probable term (e.g., the term with the highest attached probability). In another embodiment, program 150 prompts the user with the top predicted terms and allows the user to select the next term in the sequence. In a further embodiment, program 150 prompts the user if no predicted term meets a predetermined probability threshold. For example, if a probability threshold is set at a 50% and no predicted terms have a probability greater than 50%, then program 150 prompts the user with a list of the predicted terms (e.g., summaries). In yet another embodiment, responsive to the prediction and generation of a term, program 150 appends the generated term to the end of the sequence and feeds the new sequence into model 152 for the prediction and generation of consecutive terms. In an embodiment, program 150 appends a generated sequence into a set of generated sequences which represents a generated summarization for a document or corpus. In various embodiments, program 150 halts feeding sequences and vectors into model 152 if the predicted probability of all the terms falls under a predetermined probability threshold level, for example 50%. In an embodiment, program 150 logs the document and the generated summary into corpus 124. In various embodiments, program 150 constructs a document (e.g., downloadable document, spreadsheet, image, graph, etc.) containing every generated sequence, representing an aggregated summarization of all prioritized and relevant sections. In this embodiment, the document is a tangible digitally or physical document (e.g., printed). In another embodiment, program 150 creates a visual representation of a document, allowing a user to interact, add, modify, and/or remove one or more summarization sequences. In yet another embodiment, program 150 presents one or more summarization sequences on a graphical user interface or a web graphical user interface (e.g., generates hypertext markup language contained the generated summaries).

Figure 3:
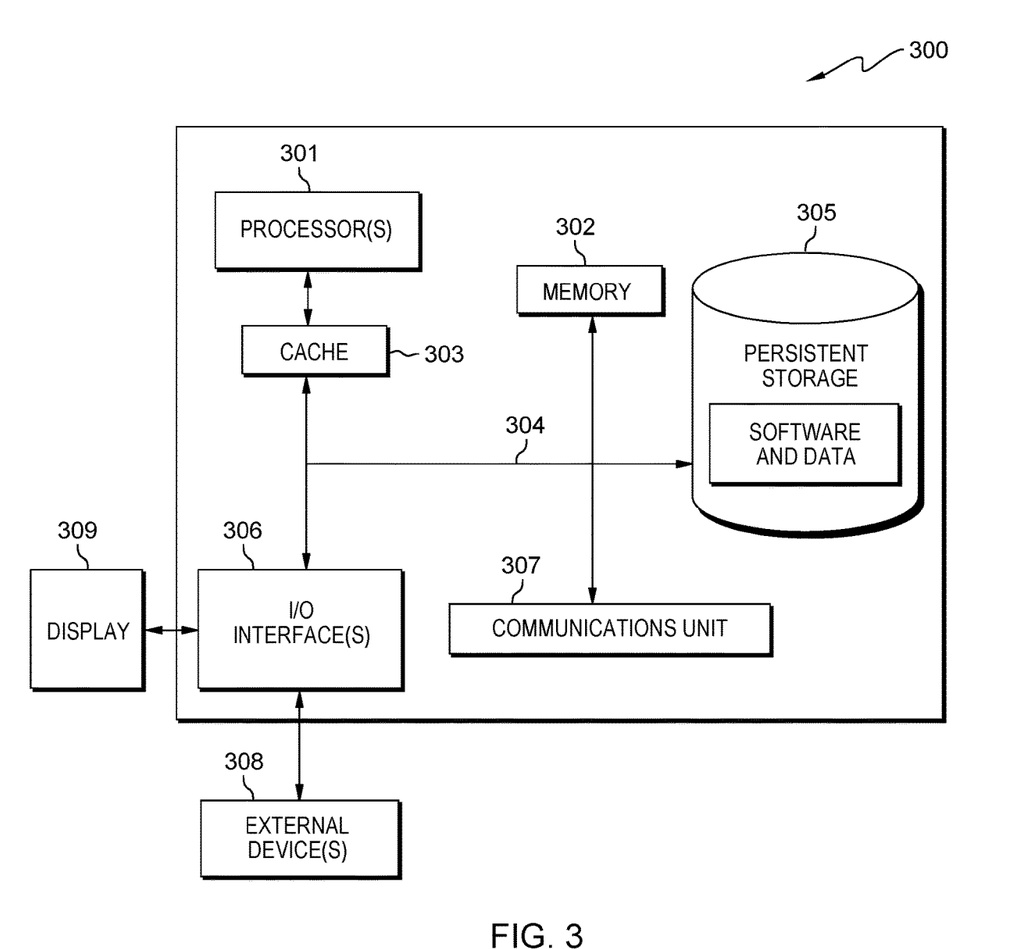
FIG. 3 is a block diagram of components of the computing device and server computer, in accordance with an embodiment of the present invention.

Server computer 120 includes communications fabric 304, which provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications, and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of computer processor(s) 301 by holding recently accessed data, and data near accessed data, from memory 302.

Program 150 may be stored in persistent storage 305 and in memory 302 for execution by one or more of the respective computer processor(s) 301 via cache 303. In an embodiment, persistent storage 305 includes a magnetic hard disk drive. Alternatively, or in addition to a magnetic hard disk drive, persistent storage 305 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program 150 may be downloaded to persistent storage 305 through communications unit 307.

I/O interface(s) 306 allows for input and output of data with other devices that may be connected to server computer 120. For example, I/O interface(s) 306 may provide a connection to external device(s) 308, such as a keyboard, a keypad, a touch screen, and/or some other suitable input device. External devices 308 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 305 via I/O interface(s) 306. I/O interface(s) 306 also connect to a display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   determining, by one or more computer processors, one or more contextually relevant sections utilizing a long short-term memory model or gated recurrent neural network based on a corpus size;
   generating, by one or more computer processors, a relevancy level for each of the one or more respective determined sections and a relevancy value for each sentence in the one or more respective determined sections, wherein the relevancy value for each sentence in the one or more respective determined sections is based on a comparison object;

prioritizing, by one or more computer processors, each of the one or more determined sections based on the respective relevancy level and relevancy values; and generating, by one or more computer processors, one or more textual summaries based on the prioritized sections, wherein the generated one or more textual summaries are aggregated into a document and allows the user to remove the one or more generated textual summaries, wherein generating the one or more textual summaries further comprises:

responsive to the one or more generated summaries respectively not exceeding a probability threshold, prompting, by one or more computer processors, the user to select a next term out of a list of probable generated summary terms;

responsive to a user selection, appending, by one or more computer processors, the user selection to the end of a new sequence of textual summaries into the long short-term memory model or the gated recurrent neural network for subsequent prediction and generation of summary terms;

responsive to a respective probability of all terms in the list of probable generated summary terms not exceeding the probability threshold level, halting, by one or more computer processors, feeding summary terms into the long short-term memory model or gated recurrent neural network.

2. The method of claim 1, wherein generating the relevancy level for each of the one or more respective determined sections, comprises:

assigning, by one or more computer processors, a numerical weight to each of the one or more respective determined sections based on a calculated relevancy to a document or corpus.

3. The method of claim 2, wherein sections with similar numerical weights possess similar semantic abilities and low respective Euclidean distances.

4. The method of claim 1, wherein generating the one or more textual summaries based on the prioritized sections, wherein the generated one or more textual summaries are aggregated into the document, comprises:

removing, by one or more computer processors, one or more sections that do not meet nor exceed a relevancy threshold;

recreating, by one or more computer processors, a document or corpus with only sections that exceed the relevancy threshold; and generating, by one or more computer processors, one or more summaries based on the recreated document or corpus.

5. The method of claim 1, wherein generating the one or more textual summaries based on the prioritized sections, wherein the generated one or more textual summaries are aggregated into the document, comprises:

generating, by one or more computer processors, a sequence of summary terms with attached probabilities based on the prioritized sections;

selecting, by one or more computer processors, the generated sequence with a highest attached probability; and appending, by one or more computer processors, the selected sequence to a set of generated sequences.

6. A computer program product comprising:

one or more computer readable storage media and program instructions stored on the one or more computer readable storage media, the stored program instructions comprising:

program instructions to determine one or more contextually relevant sections utilizing a long short-term memory model or gated recurrent neural network based on a corpus size;

program instructions to generate a relevancy level for each of the one or more respective determined sections and a relevancy value for each sentence in the one or more respective determined sections, wherein the relevancy value for each sentence in the one or more respective determined sections is based on a comparison object;

program instructions to prioritize each of the one or more determined sections based on the respective relevancy level and relevancy values; and program instructions to generate one or more textual summaries based on the prioritized sections, wherein the generated one or more textual summaries are aggregated into a document and allows a user to remove the one or more generated textual summaries, wherein the program instructions to generate the one or more textual summaries comprise:

program instructions to, responsive to the one or more generated summaries respectively not exceeding a probability threshold, prompt the user to select a next term out of a list of probable generated summary terms;

program instructions to, responsive to a user selection, append the user selection to the end of a new sequence of textual summaries into the long short-term memory model or the gated recurrent neural network for subsequent prediction and generation of summary terms;

program instructions to, responsive to a respective probability of all terms in the list of probable generated summary terms not exceeding the probability threshold level, halt feeding summary terms into the long short-term memory model or gated recurrent neural network.

7. The computer program product of claim 6, wherein the program instructions, to generate the relevancy level for each of the one or more respective determined sections, comprise:

program instructions to assign a numerical weight to each of the one or more respective determined sections based on a calculated relevancy to a document or corpus.

8. The computer program product of claim 7, wherein sections with similar numerical weights possess similar semantic abilities and low respective Euclidean distances.

9. The computer program product of claim 6, wherein the program instructions, to generate the one or more textual summaries based on the prioritized sections, wherein the generated one or more textual summaries are aggregated into the document, comprise:

program instructions to remove one or more sections that do not meet nor exceed a relevancy threshold;

program instructions to recreate a document or corpus with only sections that exceed the relevancy threshold; and program instructions to generate one or more summaries based on the recreated document or corpus.

10. The computer program product of claim 6, wherein the program instructions, to generate the one or more textual summaries based on the prioritized sections, wherein the generated one or more textual summaries are aggregated into the document, comprise:
- program instructions to generate a sequence of summary terms with attached probabilities based on the prioritized sections;
- program instructions to select the generated sequence with a highest attached probability; and
- program instructions to append the selected sequence to a set of generated sequences.

11. A computer system comprising:
- one or more computer processors;
- one or more computer readable storage media; and
- program instructions stored on the computer readable storage media for execution by at least one of the one or more processors, the stored program instructions comprising:
  - program instructions to determine one or more contextually relevant sections utilizing a long short-term memory model or gated recurrent neural network based on a corpus size;
  - program instructions to generate a relevancy level for each of the one or more respective determined sections and a relevancy value for each sentence in the one or more respective determined sections, wherein the relevancy value for each sentence in the one or more respective determined sections is based on a comparison object;
  - program instructions to prioritize each of the one or more determined sections based on the respective relevancy level and relevancy values; and
  - program instructions to generate one or more textual summaries based on the prioritized sections, wherein the generated one or more textual summaries are aggregated into a document and allows a user to remove the one or more generated textual summaries, wherein the program instructions to generate the one or more textual summaries comprise:
    - program instructions to, responsive to the one or more generated summaries respectively not exceeding a probability threshold, prompt the user to select a next term out of a list of probable generated summary terms;
    - program instructions to, responsive to a user selection, append the user selection to the end of a new sequence of textual summaries into the long short-term memory model or the gated recurrent neural network for subsequent prediction and generation of summary terms;
    - program instructions to, responsive to a respective probability of all terms in the list of probable generated summary terms not exceeding the probability threshold level, halt feeding summary terms into the long short-term memory model or gated recurrent neural network.

12. The computer system of claim 11, wherein the program instructions, to generate the relevancy level for each of the one or more respective determined sections, comprise:
- program instructions to assign a numerical weight to each of the one or more respective determined sections based on a calculated relevancy to a document or corpus.

13. The computer system of claim 12, wherein sections with similar numerical weights possess similar semantic abilities and low respective Euclidean distances.

14. The computer system of claim 11, wherein the program instructions, to generate the one or more textual summaries based on the prioritized sections, wherein the generated one or more textual summaries are aggregated into the document, comprise:
- program instructions to remove one or more sections that do not meet nor exceed a relevancy threshold;
- program instructions to recreate a document or corpus with only sections that exceed the relevancy threshold; and
- program instructions to generate one or more summaries based on the recreated document or corpus.

15. The computer system of claim 11, wherein the program instructions, to generate the one or more textual summaries based on the prioritized sections, wherein the generated one or more textual summaries are aggregated into the document, comprise:
- program instructions to generate a sequence of summary terms with attached probabilities based on the prioritized sections;
- program instructions to select the generated sequence with a highest attached probability; and
- program instructions to append the selected sequence to a set of generated sequences.

* * * * *